J. HUDRY.
RUNNER ATTACHMENT FOR CHILDREN'S VEHICLES.
APPLICATION FILED JUNE 21, 1920.

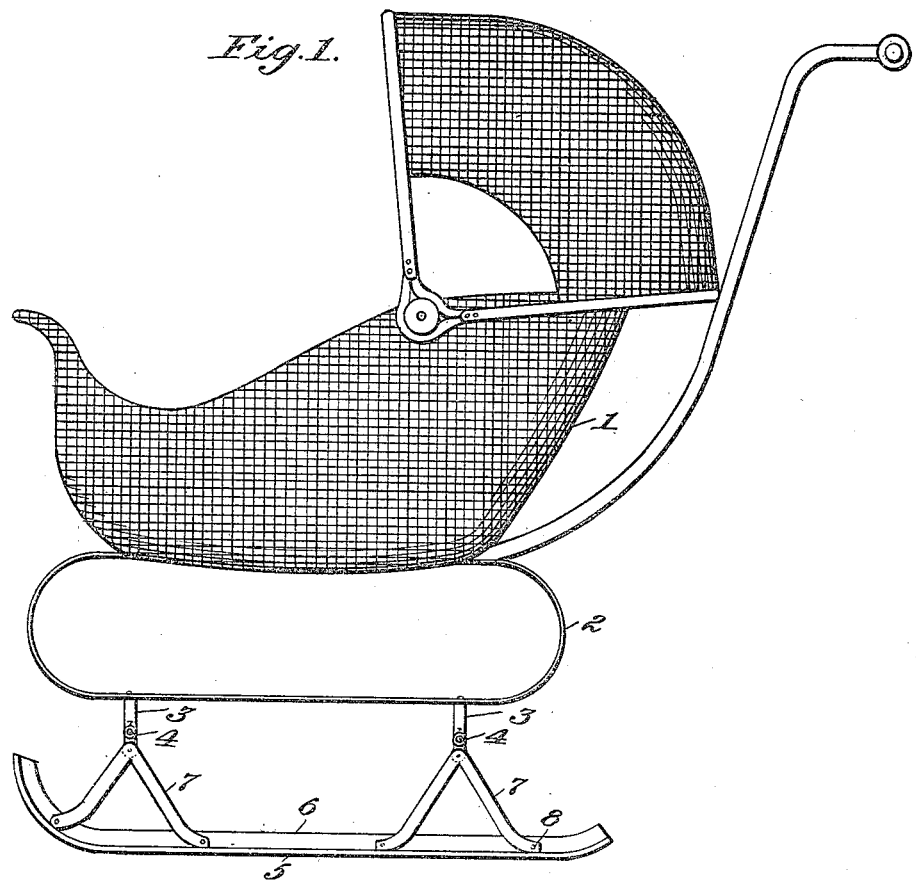
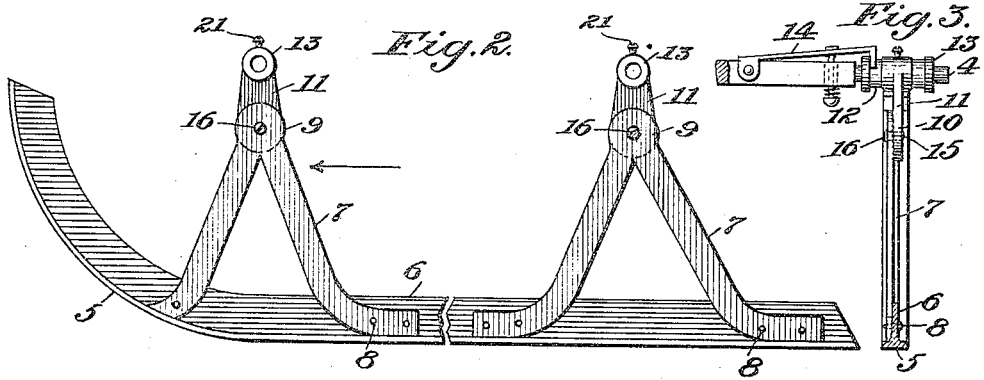

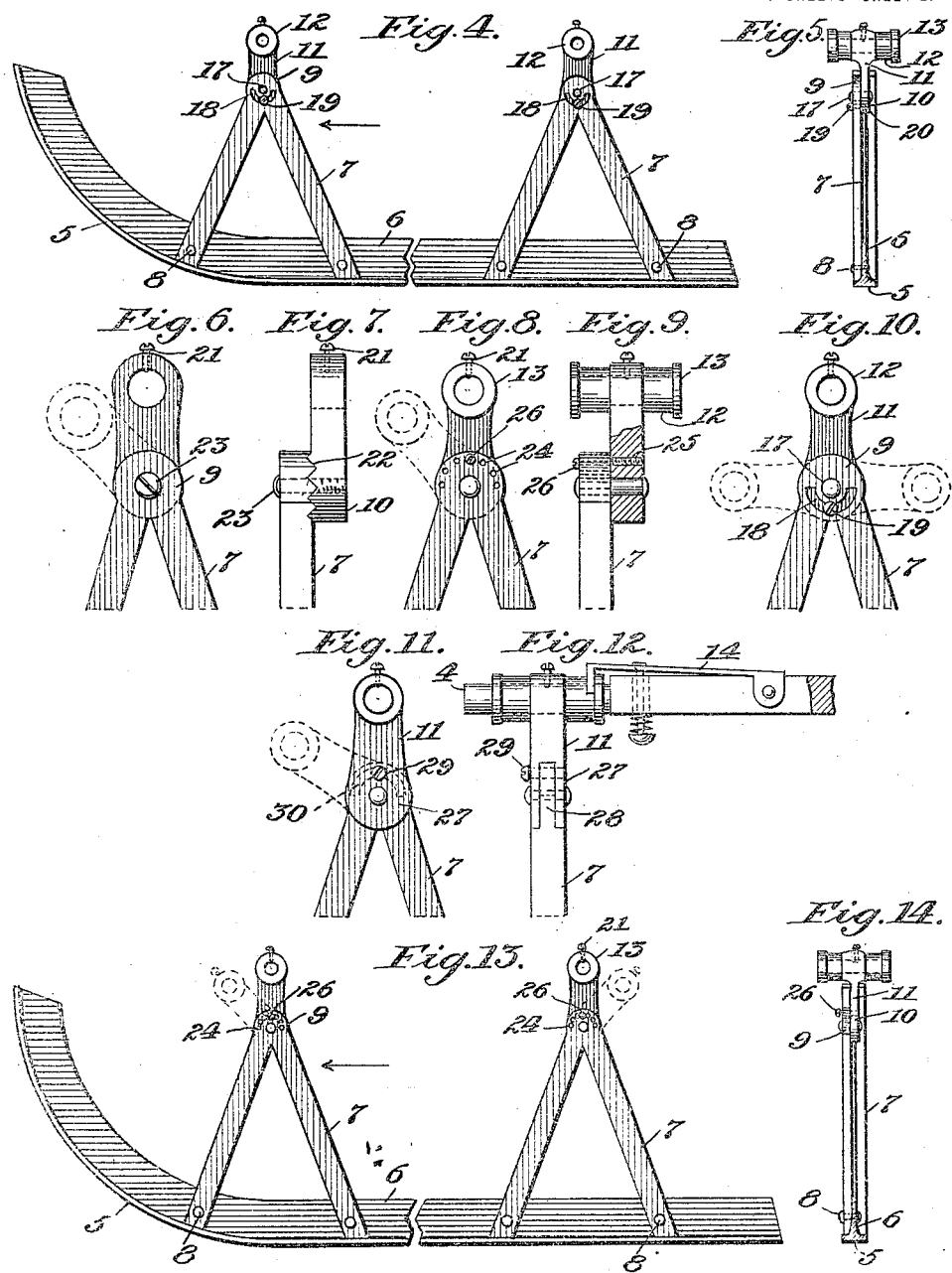

1,374,011.

Patented Apr. 5, 1921.

3 SHEETS—SHEET 3.

Inventor:
John Hudry,
by
Att'y.

UNITED STATES PATENT OFFICE.

JOHN HUDRY, OF HAZLETON, PENNSYLVANIA.

RUNNER ATTACHMENT FOR CHILDREN'S VEHICLES.

1,374,011. Specification of Letters Patent. Patented Apr. 5, 1921.

Application filed June 21, 1920. Serial No. 390,406.

*To all whom it may concern:*

Be it known that I, JOHN HUDRY, a citizen of the United States, residing at Hazleton, in the county of Luzerne and State of Pennsylvania, have invented a certain new and useful Improvement in Runner Attachments for Children's Vehicles, of which the following is a specification.

This invention relates to sled runner attachments for vehicles, and the object of the invention is to provide a runner attachment for children's carriages, go-carts, wagons or the like, of simple and economical construction, and which may readily be applied to and removed from the vehicle, and which will be applicable to carriages or vehicles in which the front and rear axles are of different distances apart and which may be at different elevations or out of horizontal alinement.

The invention consists in a runner attachment for children's carriages and the like vehicles, comprising a runner bar having the usual curved forward end and provided with two spaced substantially inverted V-shaped standards fixed to the runner, hub or axle-engaging members pivoted to the upper ends of said standards, and interengaging means on said standards and hub members for locking the hub members in adjusted positions, whereby the hub or axle-engaging members may be adjusted to vary the distance between the axle-engaging portions thereof in a horizontal plane and also to vary the positions of said axle-engaging portions of the hub members vertically with relation to each other, all substantially as I will proceed now more particularly to set forth and finally claim.

Figure 15:
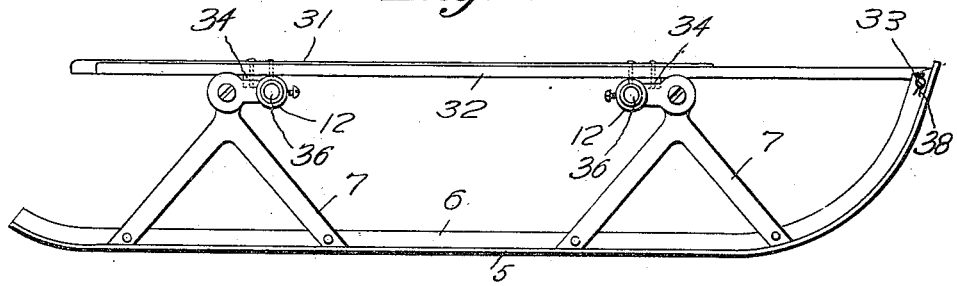
Figure 16:
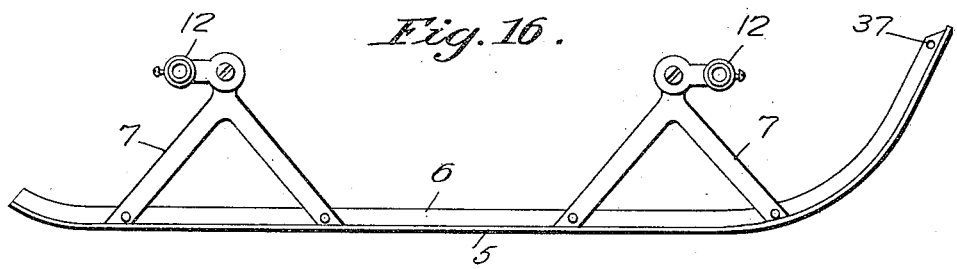
Figure 17:
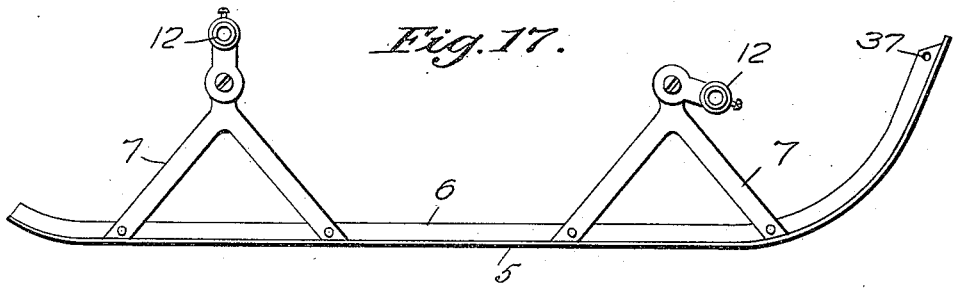
Figure 18:
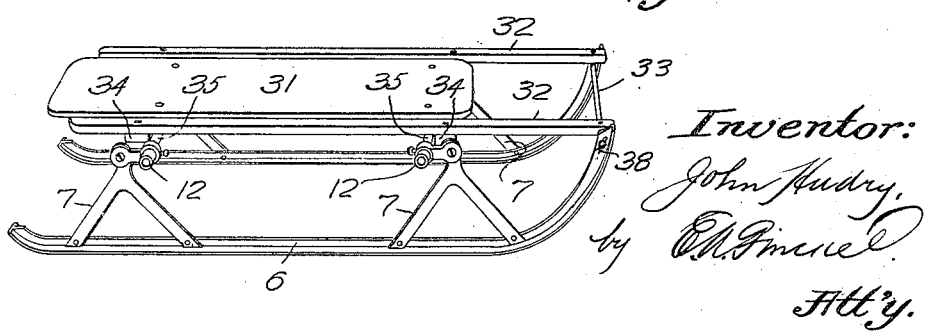

In the accompanying drawings illustrating the invention, in the several figures of which like parts are similarly designated, Figure 1 is a side elevation of a child's carriage of conventional form with the invention applied thereto. Fig. 2 is a side elevation, on a larger scale, of one form of the runner attachment, showing the runner broken between the standards to bring the view within the sight of the sheet. Fig. 3 is an edge view of the front portion of the runner of Fig. 2, looking in the direction of the arrow, and showing a portion of the axle and the manner of attaching the runner to the axle. Fig. 4 is a view similar to Fig. 2 showing another form of connection between the standards and the hub members. Fig. 5 is an edge view of the front portion of the runner of Fig. 4, looking in the direction of the arrow. Figs. 6 and 7 are a side elevation and edge view, respectively, on a larger scale, of the upper portion of a standard, showing another form of adjustable connection between the standard and hub member, and also showing a modified form of hub member. Figs. 8 and 9 are a side elevation and edge view, respectively, of another form of adjustable connection between the standard and hub member. Fig. 10 is a side view, on a larger scale, of the upper portion of the standard and connection shown in Fig. 4, and showing in dotted lines the limits of adjustment of the hub members upon opposite sides of the standards. Figs. 11 and 12 are a side elevation and edge view, respectively, of still another form of adjustable connection between the standard and hub member, and showing in Fig. 12 the usual wheel latch for locking the runner attachment to the axle. Fig. 13 is a side elevation of a runner and standards with the form of connection between the standards and hub members shown in Figs. 8 and 9, the runner being broken centrally to bring the view within the sheet and showing in dotted lines the hub members adjusted in opposite directions for applying the runner to a vehicle having its axles wider apart than the standard distance. Fig. 14 is an edge view of the front portion of the runner of Fig. 13, looking in the direction of the arrow. Fig. 15 is a side elevation of a sled with the runner attachments applied thereto. Figs. 16 and 17 are side elevations of one of the runner attachments, showing the hub members adjusted in different positions. Fig. 18 is a perspective view on a smaller scale, of the sled.

In accordance with this invention it will be understood that when it is desired to use a carriage, go-cart, or other like vehicle, as a sled, the wheels thereof will be removed, and there will be two runner attachments to be attached to the axle nibs on opposite sides of the vehicle in place of the wheels, and as the runner attachments are of the same construction, a description of one will suffice for both.

In the drawings, Fig. 1, a baby carriage of ordinary construction is shown, and comprises the body 1, the springs 2, and the axle-supporting brackets 3 from which project the axle nibs 4, and upon which the wheels are mounted and adapted to receive the runner attachments when it is desired to use the vehicle as a sled.

The runner attachments comprise the runner 5, preferably, and as herein shown, constructed of inverted T-iron having its forward or leading end bent upwardly. Secured to the upstanding flange 6 of the runner 5 are two standards 7 of substantially inverted V-shape. As shown in the drawings, these standards are secured to the flange of the runner by means of rivets 8, but it will be obvious that said standards may be formed or cast with the runner. The upper ends 9 of the standards are formed substantially circular or disk-like and are adapted to engage and be connected with complemental circular or disk-like portions 10 of shanks 11 projecting from the hubs or axle-engaging portions 12.

As shown more particularly in Figs. 3, 5, 9, 12 and 14, the hubs or axle-engaging portions 12 are tubular and project from opposite sides of the shanks 11, and are provided with flanges or other suitable projections 13 at their opposite ends adapted to be engaged by the usual or ordinary spring catches 14 commonly used for locking the wheels upon the axles of baby carriages and the like vehicles, as shown in Figs. 3 and 12.

It has been found that children's carriages of all descriptions to which this invention would be applicable, are constructed with their front and rear axles of a substantially uniform or standard distance apart, and if at all different, it is only to an extent of about two or three inches, and in order to provide for this difference in the application of the runner attachments of this invention, the standards 7 are so spaced upon the runner that when the hub or axle-engaging members are in a substantially vertical position they fit the standard distance between the front and rear axles, and said hubs or axle-engaging portions are adjustably mounted upon or connected with the standards, so they may be adjusted toward or away from each other so that the distance therebetween may be adjusted to come within or go beyond the standard distance between the front and rear axles to fit upon the vehicle to which the attachments are to be applied.

As shown in Figs. 2 and 3, the adjacent faces of the complemental disk-like portions of the standards 7 and the shanks 11 of the hub members are provided with interlocking teeth 15 adapted to be firmly clamped together by a pivot screw 16, whereby the axle-engaging hubs may be adjusted to either side of the standard by loosening the screw and tightening the screw to lock the parts in adjusted positions.

In Figs. 4, 5 and 10, the axle-engaging hubs have their shanks loosely riveted to the standards, as at 17, and the standards provided with a semicircular slot 18 arranged below and concentric with the pivot 17, and passing through said slot is a set screw 19 fitted in a screwthreaded opening 20 in and carried by the shank of the axle-engaging hub member, whereby the hub members may be adjusted in opposite directions upon the standards, as indicated in dotted lines Fig. 10, and locked in adjusted positions by tightening the screw 19.

In Figs. 6 and 7, a modified form of hub or axle-engaging member is shown, and is formed of a straight flat piece of metal without the oppositely projecting flanged portions, as in the other views, and is particularly designed to be used upon vehicles, the axles of which are not provided with the usual wheel locking clips, and is provided with a set screw 21 by which the runner attachment may be locked to the axle nibs. In this form of the device, the standards and the hub members are provided with interlocking teeth 22 and a clamping screw 23 for adjusting the hub members, the same as in Figs. 2 and 3.

In Figs. 8, 9 and 13, 14, the standards and hub members are loosely riveted together and the standards are provided with a semicircular series of openings 24 and the shanks of the hub members are provided with a single screw threaded opening 25 adapted to register with any one of the series of openings 24 in the standards and to receive a screw pin 26 passed through the openings 24 and screwed into the threaded opening 25 in the hub-member to lock the hub members in adjusting positions.

In Figs. 11 and 12, the lower ends of the shanks of the hub members are bifurcated, as at 27, and fit upon and are loosely riveted to the reduced ends 28 of the standards, and fitted and carried by the bifurcated end of the shanks is a screw 29 passing through a semicircular slot 30 in the end of the standard, for adjusting and locking the hub members in adjusted positions.

In all the forms of the invention herein shown, the hub members are provided with a set screw 21 similar to that described in connection with Figs. 6 and 7, to serve as an additional means for locking the runner attachment to vehicles which are not provided with the usual flange engaging clips for locking the wheels upon the axles.

The manner of applying the invention to vehicles will be understood from the foregoing description, and needs no further description, and it will be understood that the adjustability of the hub members or axle-engaging portions makes it possible to apply the runner attachments to various makes and styles of children's carriages or vehicles, the axles of which may differ in their distance apart or which may differ in elevation from the ground; and furthermore, it will be observed that by providing the projecting axle-engaging portions of the hub members with flanges upon opposite sides, the attachments may be applied to either side of a vehicle having the usual wheel locking clips.

It will also be understood, that the runner attachments of this invention, are also applicable for use in connection with an ordinary sled body, it simply being necessary to provide such a sled body with ordinary axles or axle nibs to receive the runner attachments, and which attachments may readily be removed and replaced by wheels, to convert the sled into a coaster wagon.

In Figs. 15 and 18 I have shown a sled provided with the runner attachments of this invention, and in which 31 is the usual top or seat portion, and 32 the usual side rails connected at their forward ends by the cross-bar or foot-rail 33, having its ends projecting slightly beyond the side rails. Secured to the underside of the top and side rails are cross cleats 34, and also secured to the underside of the top and side rails adjacent to the inner sides of the cleats 34 are axle members 35 having nibs 36 projecting beyond the sides of the top, and these projecting nibs are adapted to receive the hub members 12 of the runner attachments, which may be of any of the forms hereinbefore described. In this application of the invention, the forward ends of the runners are provided with holes 37 adapted to fit upon the projecting ends of the cross-bar or foot-rail 33 which are adapted to receive cotter-pins 38 or other removable fastening devices for holding the runners in place, the runners as thus attached to the body of the sled serving as a support for the front ends of the side rails.

The sled as thus constructed may readily be taken apart by removing the cotter pins 38 and removing the runner attachments from the axles, and the parts stacked together in a compact condition for storage and transportation. And, when the runner attachments are removed, wheels or rollers may be applied to the axles and the device used as a wagon or coaster.

In Figs. 16 and 17 the hub members of the runner attachments are shown adjusted to different positions to vary the distance between the axle-engaging portions to adapt the attachment to sled bodies or tops having axles slightly different distances apart.

What I claim is:

1. A runner attachment for children's carriages and the like, comprising a runner, a pair of standards fixed thereto and rising therefrom, hub or axle-engaging members pivoted to the upper ends of said standards and adapted to be adjusted relatively thereto, means for locking the hub or axle-engaging members in adjusted positions, and means for locking the hub members to the axles of the carriage.

2. A runner attachment for children's carriages and the like, comprising a runner, a pair of standards fixed to and rising therefrom, hub or axle-engaging members pivoted to the upper ends of said standards and adapted to be adjusted relatively thereto, interlocking means on said standards and hub members to lock said hub members in adjusted positions, and means for locking the hub members to the axles of the carriage.

3. A runner attachment for children's carriages and the like, comprising a runner, a pair of inverted V-shaped standards fixed to and rising from said runner and terminating in a disk-like upper end, hubs or axle-engaging members having a tubular axle-engaging portion and a depending shank portion terminating in a disk-like end adapted to engage the disk-like end of the standards, means for pivotally and adjustably connecting said hub members with said standards, means for locking said hub members in adjusted positions, and means for locking the hub members to the axles of the carriage.

4. A runner attachment for children's carriages and the like, comprising a runner, a pair of inverted V-shaped standards fixed to and rising from said runner and terminating in a disk-like upper end, hubs or axle-engaging members having a tubular axle-engaging portion and a depending shank portion terminating in a disk-like end adapted to fit and engage the disk-like ends of the standards, means for pivotally and adjustably connecting said disk-like portions together, and complemental means on said disk-like portions for locking the hub members in adjusted positions.

5. A runner attachment for children's carriages and the like, comprising a runner, a pair of standards rising from said runner and terminating in disk-like upper ends, hub members having tubular axle-engaging portions and depending shank portions terminating in disk-like ends adapted to fit and engage the disk-like portions of the standards, means for pivotally and adjustably connecting said disk-like ends of the standards and hub members, complemental interlocking means on said disk-like ends for locking the hub members in adjusted positions, and flanges on the tubular axle-engaging portions of the hub members adapted to be engaged by spring clips on the axles of said carriage to lock the runner attachment in place.

6. A runner attachment for children's carriages and the like, comprising a runner, a pair of standards rising from said runner and terminating in disk-like upper ends, hub members having tubular axle-engaging portions and depending shanks terminating in disk-like ends adapted to fit and engage the disk-like ends of the standards, means for pivotally and adjustably connecting said disk-like ends of the standards and hub members, complemental interlocking means on said disk-like ends for locking the hub members in adjusted positions, and flanges on the opposite ends of the tubular axle-engaging portions of the hub members adapted to be engaged by spring clips on the axles upon either side of said carriage to lock the runner attachment in place.

7. A sled, comprising a top, axles fixed to said top and having axle nibs projecting beyond the sides of said top, and runner attachments having pivotally adjustable axle-nib engaging portions adapted to be detachably fixed upon said axles.

8. A sled, comprising a top, side rails projecting beyond the front end of said top, a cross-bar or foot-rail connecting the front ends of said side rails and projecting beyond the outer sides thereof, axles secured to the underside of said top and side rails and projecting beyond the sides thereof, and runners having pivotally adjustable axle-engaging hub members adapted to be detachably fixed upon said axles, said runners having openings at their forward ends adapted to fit upon the projecting ends of the cross-bar or foot-rail, and detachable fastening means for securing the runners in place upon said cross-bar or foot-rail.

In testimony whereof I have hereunto set my hand this 17 day of June, 1920.

JOHN HUDRY.

Witnesses:
P. G. HEIDENREICH,
JACOB J. SCHIEFER.